J. MULL.
Griddle Cake Baker.
No. 53,744.
Patented April 3, 1866.
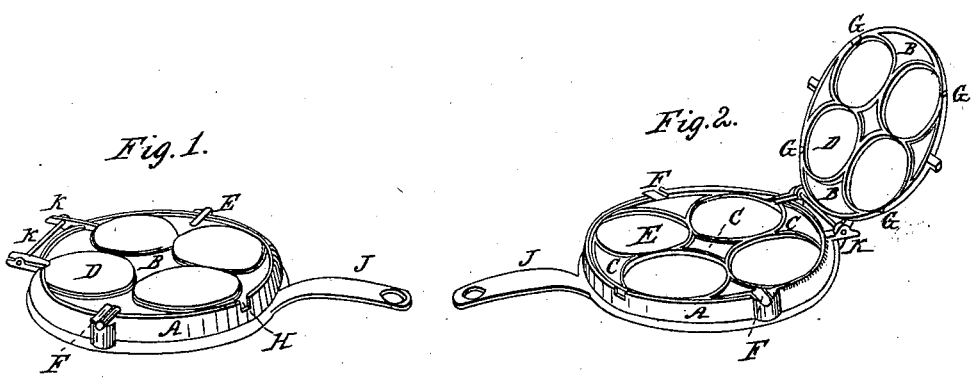
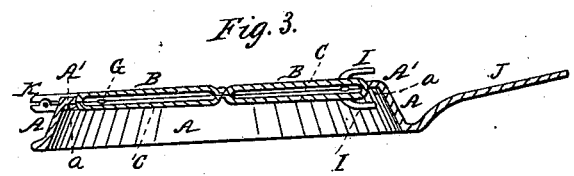
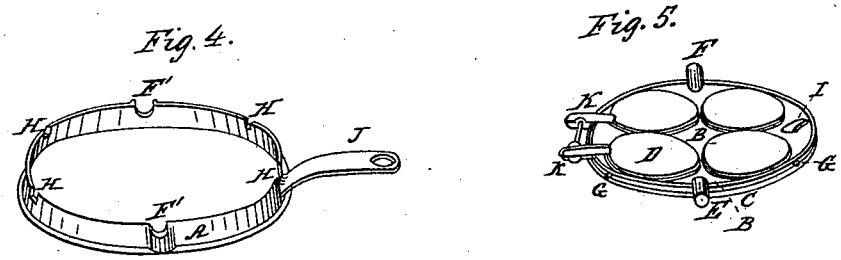
Witnesses:
Charles D. Kellum
R. H. Reilley
Inventor:
Jonas Mull

UNITED STATES PATENT OFFICE.

JONAS MULL, OF TROY, NEW YORK, ASSIGNOR TO HIMSELF, ASA D. REED, AND J. R. CALKINS.

GRIDDLE-CAKE BAKER.

Specification forming part of Letters Patent No. 53,744, dated April 3, 1866.

*To all whom it may concern:*

Be it known that I, JONAS MULL, of the city of Troy, county of Rensselaer, and State of New York, have invented a new and improved and useful Griddle-Cake Baker; and I do hereby declare that the following is a full, clear, and exact description of the same, reference being hereby had to the accompanying drawings, which make and form a part of this specification.

Like letters represent and refer to like or corresponding parts.

Figure 1 is a perspective view, and showing the said griddle in condition for baking purposes, as used upon a stove, range, or elsewhere for the baking of griddle-cakes in the manner hereinafter set forth. Fig. 2 is also a perspective view, and showing the two baking-sections open and in condition to receive the material to be baked into griddle-cakes, in the manner substantially as hereinafter described and set forth. Fig. 3 is a vertical section through the center on a line with the handle, and showing the recesses in which said cakes are baked and the appertures leading thereto, for the purposes substantially as hereinafter described and set forth. Fig. 4 shows the outer surrounding rim in which the two sections in which and between which said cakes are baked are turned over or revolve, in the manner and for the purposes substantially as herein described and set forth. Fig. 5 represents the two griddle-cake baking-sections and the pivots on which the same turn or revolve in the outer surrounding rim.

The nature of my said invention and improvements consists in the employment of openings, flues, or apertures between the upper and lower sections, containing recesses for the reception of material from which to bake griddle-cakes, and which apertures shall lead from such recesses to the outer edge of such upper and lower sections, in combination with an inward projection or annular flange upon or near the top of the outer surrounding rim and upon the inside thereof, in the manner and for the purposes substantially as hereinafter described and set forth.

Prior to my aforesaid invention and improvements griddle-cakes have never, to my knowledge, been baked upon both sides at the same time without the same being changed or turned over for the purpose of baking both sides thereof, nor has the smoke or gases arising therefrom been conducted away therefrom through or by means of flues or apertures into the fire-chamber or flue of any stove or range by the draft thereof, and thus and thereby prevent the escape of the same into the room where such stoves or ranges are used. But by my said invention and improvements both sides of such cakes are baked at the same time and operation, and the smoke and gases arising therefrom are conducted off and into the flue or fire-chamber by the draft, in the manner and by the means substantially as herein described and set forth.

By the use or employment of my said invention and improvements griddle-cakes are baked in greater or less quantities in the most perfect and satisfactory manner, without the escape of gas or smoke therefrom into the cooking-room, and thereby cause or produce an unpleasant smell or odor.

Having thus described the nature of my said invention and the advantages gained thereby, and to enable others skilled in the art to which my said invention relates to make and use the same and to put it into public use and on sale, I will here proceed to describe the construction and operation of the same, which is as follows, to wit:

A, Figs. 1, 2, 3, and 4, is the outer surrounding rim, in which and upon which the upper and lower cake-baking sections, B and C, Figs. 2 and 3, are placed and turned or revolved. This rim may be of any size, height, or shape to answer the purposes required. Upon the upper edge or part of the said surrounding rim A, I construct the flange A′, as seen at Fig. 3. This flange projects inward toward the said cake-baking surfaces B and C, and as near the outer edge thereof as possible, and yet allow the same to be turned over or revolved within the said inward-projecting flange A′. The said flange may be of any desired size or form, and it is for the purpose of allowing the said cake-baking sections to be freely turned over or revolved within said rim, while at the same time it gives more or greater freedom of draft through the openings or apertures G, Figs. 2, 3, and 5, by which and through which the gases and smoke arising from the baking of the cakes within the recesses D and E, Fig.

2, are conducted therefrom into the flues of the cooking-stove or range, or into the fire-chamber thereof. The said recesses D and E for the reception of the material to be baked into cakes may be of any size in diameter, and may have intermediate space, as may be required or desired, and there may be as many such upon and within the said upper and lower cake-baking sections, B and C, as may be deemed best or suitable for the rapid baking of cakes. From such recesses I construct an opening or aperture, G, to the outer edge of the said upper and lower sections, as seen at G, Fig. 2. The said openings or apertures may be of any suitable size or form; but I usually construct them much larger in diameter at the outer edge of the said cake-baking sections than at that part which immediately opens into the said recesses D and E. This is for the purpose of giving more freedom of draft in the conducting off or away the gases or smoke arising from the baking of the cakes within the said recesses D and E. The said inward surrounding flange or projection A' will be so constructed and arranged as to be immediately above the said openings or apertures G, as seen at Fig. 3. It will be seen that by the use of the said flange or inward projection A' there will be a space or surrounding chamber, a, Fig. 3, by means of which the said gases or smoke passing out of and from the said apertures G will be permitted freely to pass into the fire or fire-chamber immediately below the same, and thus and thereby prevent any escape of such gases or smoke into the cooking-room when the same may be used in the manner aforesaid. The said upper and lower cake-baking surfaces, B and C, may be made of cast-iron of any suitable thickness and form.

The outer surrounding rim, A, Figs. 1, 2, and 3, is made of cast-iron of any desired thickness or height, and contains, as aforesaid stated, the inward surrounding flange or projection A'.

F' F' are recesses in the upper part of said rim A, for the purpose of receiving the pins or projections F F cast upon the said respective upper and lower cake-baking surfaces B and C, and which are for the purpose of enabling the said sections, when in a closed position, to be turned over or revolved for heating or baking purposes, and they (the said pins F) may be of any desired size or strength.

The said recesses D and E upon the inward surfaces of the said upper and lower sections or plates, B and C, are for the purpose of receiving the material from which said cakes are to be baked, and they may be of any capacity desired, and the said sections or plates B and C may be made to fit together as closely as possible, excepting that part, of course, containing the aforesaid apertures G.

The said upper and lower section or plates, B and C, are united together by means of the hinges K and K, as shown at Figs. 1, 2, 3, and 5, which hinges are for the purposes of permitting the said sections to be opened or closed, as the case may require, during the operation of making or baking the cakes and the removing of the same therefrom when baked, as aforesaid.

I and I are projecting handles cast upon the said respective sections or plates, by means of which the same are opened or separated when desired.

The said griddle turns over or revolves easily upon the said flanges or central pins F and F by touching and bearing down upon the said hinges K and K. When the said griddle is in a horizontal plane or condition the said hinges K and K will be in the recesses H and H contained in the upper part of the said outer rim, A, and seen more clearly at Fig. 4.

The said openings or apertures G may be made by the cutting or casting of a groove in each of the said upper and lower sections or plates, B and C, so that when the said sections or plates are put together, as seen at Figs. 3 and 5, the said openings or apertures will be made complete and ready for use, as aforesaid, and as seen at G, Figs. 3 and 5.

Each of the recesses for receiving and baking the cakes, as aforesaid, may contain two or more of the said openings or apertures G, although one may be made of sufficient capacity to conduct away and into the fire or fire-chamber the gases and smoke arising from and by reason of the baking of cakes in the manner substantially as aforesaid.

By the means substantially as aforesaid all the gases and smoke arising from the baking of cakes as aforesaid, and which would escape into the cook-room from and by means of cake-bakers now in use, is completely carried off and away from the said griddle through the said flues, openings, or apertures G and directly into the fire or fire-chamber by means of the draft as aforesaid, and thence into the flues and to the exit-pipe leading to the chimney, unless consumed when the same comes in contact with the fire in the manner aforesaid. The larger the said aperture G or the greater the number of the same the more easily and rapidly will the said gases and smoke be carried off and away in the manner aforesaid. The said draft will operate directly below the said inward projection or flange A' surrounding the entire edge of the said cake-baker, and which flange I usually construct immediately above the said aperture G, as aforesaid, and the draft aforesaid will, by such flange or projection, A', have greater freedom to operate upon the said apertures and the said recesses connected therewith, as aforesaid and for the purposes aforesaid.

When it is desirable to use my said improved griddle-cake baker for the purposes of baking cakes therein the cover of the stove may be taken off and the said griddle be put upon the space thus uncovered, and of course over the fire below, and that section remaining above the lower section aforesaid is then raised up by means of the handle or projection I, while the projections on the said hinges K and K hold it in the position shown in Fig. 2. The said griddle is first properly heated on both sides before the material from which the cakes are to be made is put into said recesses D and E, as aforesaid. The batter or material from which the cakes are to be made is placed into the said recesses D and E. The different sections of said griddle are thereafter closed, and the griddle being sufficiently heated on both sides, and being kept so by frequent turning of the same in the manner substantially as herein described, the said cakes are thus baked quickly and evenly on both sides at the same operation.

Having thus described the nature, construction, and operation of my said invention and improvements, what I claim, and desire to secure by Letters Patent of the United States of America, is—

1. The employment of the inward and annular or surrounding flange or projection A' of the surrounding rim A, and its combination with the griddle-cake baking-sections B and C, and flues or apertures G, in the manner and for the purposes substantially as herein described and set forth.

2. The employment of the annular or surrounding chamber $a$, and the combination thereof with the flues or apertures G, and with the inner flange or surrounding projection A', in the manner and for the purposes substantially as herein described and set forth.

JONAS MULL.

Witnesses:
CHARLES D. KELLUM,
R. W. REILLEY.